United States Patent
Mathew et al.

(10) Patent No.: US 7,325,024 B2
(45) Date of Patent: Jan. 29, 2008

(54) ADDER CIRCUIT WITH SENSE-AMPLIFIER MULTIPLEXER FRONT-END

(75) Inventors: Sanu K. Mathew, Hillsboro, OR (US); Mark A. Anders, Hillsboro, OR (US); Ram K. Krishnamurthy, Portland, OR (US); Sapumal Wijeratne, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 672 days.

(21) Appl. No.: 10/728,127

(22) Filed: Dec. 4, 2003

(65) Prior Publication Data

US 2005/0125481 A1 Jun. 9, 2005

(51) Int. Cl.
*G06F 7/50* (2006.01)

(52) U.S. Cl. ..................................................... 708/706
(58) Field of Classification Search ................. 708/706
See application file for complete search history.

(56) References Cited

U.S. PATENT DOCUMENTS

| | | | |
|---|---|---|---|
| 3,553,446 A | 1/1971 | Kruy | |
| 3,993,891 A | 11/1976 | Beck et al. | |
| 5,047,976 A | 9/1991 | Goto et al. | |
| 5,257,218 A | 10/1993 | Poon | |
| 5,327,369 A | 7/1994 | Ashkenazi | |
| 5,450,560 A | 9/1995 | Bridges et al. | |
| 5,701,504 A | 12/1997 | Timko | |
| 5,805,913 A * | 9/1998 | Guttag et al. ............... | 712/209 |
| 6,269,386 B1 | 7/2001 | Siers et al. | |
| 6,496,846 B1 | 12/2002 | Bradley | |
| 6,782,406 B2 | 8/2004 | Koshy | |
| 6,789,099 B2 * | 9/2004 | Kim et al. .................. | 708/710 |
| 7,085,798 B2 * | 8/2006 | Kim et al. .................. | 708/714 |

OTHER PUBLICATIONS

Cheng, K., et al., "The Improvement of Conditional Sum Adder for Low Power Applications", *IEEE*, (1998),131-134.

Jien-Chung, L., "A Fast Binary Adder With Conditional Carry Generation", *IEEE Transactions on Computers*, 46 (2), (Feb. 1997),248-253.

Woo, Ramchan, et al., "A 670ps, 64bit Dynamic Low-Power Adder Design", *IEEE International Symposium on Crcuits and Systems*, Geneva, Switzerland,(May 28-31, 2000),pp. I-28-I31.

\* cited by examiner

*Primary Examiner*—D. H. Malzahn
(74) *Attorney, Agent, or Firm*—Schwegman, Lundberg & Woessner, P.A.

(57) ABSTRACT

An adder circuit includes a number of selectors and an adder. The selectors feed the adder with multiple input data bits. Each of the selectors includes a combination of a multiplexing network and a sense amplifier to select from a number of input values to generate the multiple input data bits. The combination of the multiplexing network and the sense amplifier acts as the state-holding element at the input of the adder, avoiding the overheads of an explicit latch stage.

26 Claims, 9 Drawing Sheets

ADDER CIRCUIT WITH SENSE-AMPLIFIER MULTIPLEXER FRONT-END

RELATED APPLICATIONS

This application is related to the following co-pending and commonly assigned application Ser. No. 09/967,240, entitled "High Performance Adder".

FIELD

Embodiments of the present invention relate generally to arithmetic logic units in integrated circuits, and more particularly to adder circuits.

BACKGROUND

Integrated circuits such as microprocessors reside in many computers and electronic devices. Some integrated circuits have adder circuits to add numbers. The numbers may have many bits, for example, thirty two bits and sixty four bits.

Integrated circuits often use the results from the adder circuit to control other functions. Thus, the speed of the adder circuit may affect the overall speed of the integrated circuit. Further, the power consumption of the adder circuit also contributes to the overall power of consumption of the integrated circuit. Therefore, improving the speed and power consumption of the adder may also improve the overall speed and power consumption of the integrated circuit.

However, as integrated circuits become more complex, designing adder circuits with improved speed and power consumption become a challenge.

DESCRIPTION OF EMBODIMENTS

Figure 1:
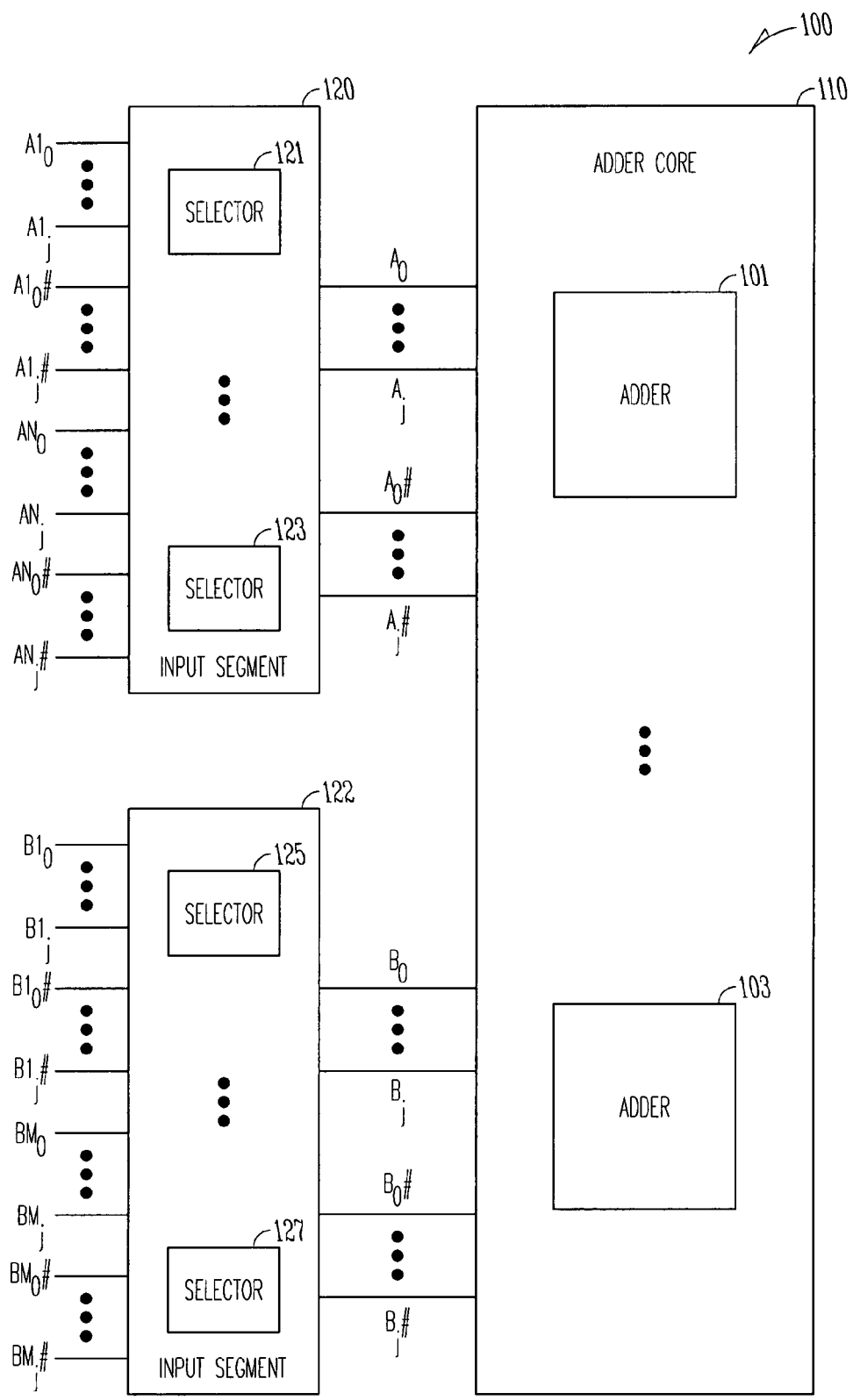
FIG. 1 shows an adder circuit.

The following description and the drawings illustrate specific embodiments of the invention sufficiently to enable those skilled in the art to practice the invention. Other embodiments may incorporate structural, logical, electrical, process, and other changes. In the drawings, like numerals describe substantially similar components throughout the several views. Examples merely typify possible variations. Portions and features of some embodiments may be included in or substituted for those of others. The scope of the invention encompasses the full ambit of the claims and all available equivalents.

FIG. 1 shows an adder circuit. Adder circuit 100 includes an adder core 110, a first input segment 120, and a second input segment 122. Input segments 120 provides a plurality of first numbers to adder core 110. The first numbers include one number represented by input data bits (input signals) $A_0$-$A_j$ ($A_0$ through $A_j$) and another number represented by input data bits $A_0\#$-$A_j\#$ ($A_0\#$ through $A_j\#$). Input segment 122 provides a plurality of second numbers to adder core 110. The second numbers include one number represented by input data bits $B_0$-$B_j$ and another number represented by input data bits $B_0\#$-$B_j\#$. Adder core 110 includes a number of adders 101 and 103 to perform arithmetic operations on the numbers represented by $A_0$-$A_j$, $A_0\#$-$A_j\#$, $B_0$-$B_j$, $B_0\#$-$B_j\#$. The index j represents the number of bits. For example, if the number has 64 bits, then j is 63 and $A_0$-$A_j$ include: $A_0$, $A_1$, $A_2$, and $A_3$ through $A_{63}$.

In some embodiments, adder 101 performs arithmetic operation on numbers represented by $A_0$-$A_j$, and $B_0$-$B_j$; and adder core 103 performs arithmetic operation on numbers represented by $A_0\#$-$A_j\#$, and $B_0\#$-$B_j\#$. In other embodiments, adder core 110 includes a single adder to perform arithmetic operation on all of $A_0$-$A_j$, $A_0\#$-$A_j\#$, $B_0$-$B_j$, $B_0\#$-$B_j\#$.

Input segment 120 selects from a number of sources A1-AN and provides one of the sources A1-AN to adder core 110 as $A_0$-$A_j$ and $A_0\#$-$A_j\#$. The number of sources provided to input segment 120 is presented by N. For example, if the number of sources is five (5), then N=5 and A0-AN include: A1, A2, A3, A4, and A5.

Each of the sources A1-AN includes multiple bits or input values. For example, A1 includes $A1_0$-$A1_j$; AN includes $AN_0$-$AN_j$. Each of the sources A1-AN also includes other input values. For example, A1 also includes $A1_0\#$-$A1_j\#$; AN also includes $AN_0\#$-$AN_j\#$. Since $A_0$-$A_j$ and $A_0\#$-$A_j\#$ are selected from sources A1-AN, $A_0$-$A_j$ may be $A1_0$-$A1_j$, or $AN_0$-$AN_j$, or other input values between A1 and AN such as $A2_0$-$A2_j$.

Input segments 120 includes a number of selectors 121 and 123 to select the sources A1-AN. The number of selectors in input segment 120 equals the number of bits of each of the sources A1-AN. For example, if each of the sources A0-AN has 64 bits, then the number of selectors of input segment 120 equals 64. For simplicity, FIG. 1 shows only two selectors in input segment 120.

In a similar fashion, input segment 122 selects from a number of sources B1-BM and provides one of the sources B1-BM to adder core 110 as $B_0$-$B_j$ and $B_0\#$-$B_j\#$. The number of sources provided to input segment 122 is presented by M. For example, if the number of sources is four, then M=4 and B0-BM include: B1, B2, B3, and B4.

Each of the sources B1-BM includes multiple bits or input values. For example, B1 includes $B1_0$-$B1_j$; BM includes $BM_0$-$AM_j$. Each of the sources B1-AN also includes other input values. For example, B1 also includes $B1_0\#$-$A1_j\#$; BM also includes $BM_0\#$-$AM_j\#$. Since $B_0$-$B_j$ and $B_0\#$-$B_j\#$ are selected from sources B1-BM, $B_0$-$B_j$ may be $B1_0$-$B1_j$, or $BM_0$-$BM_j$, or other input values between B1 and BM such as $B2_0$-$B2_j$.

Input segment 122 includes a number of selectors 125 and 127 to select the sources $B_1$-BM. The number of selectors of input segment 122 also equals the number of bits of each of the sources $B_1$-AM. For example, if each of the sources B0-BM has 64 bits, then the number of selectors of input segment 122 equals 64. For simplicity, FIG. 1 shows only two selectors in input segment 122.

Figure 2:
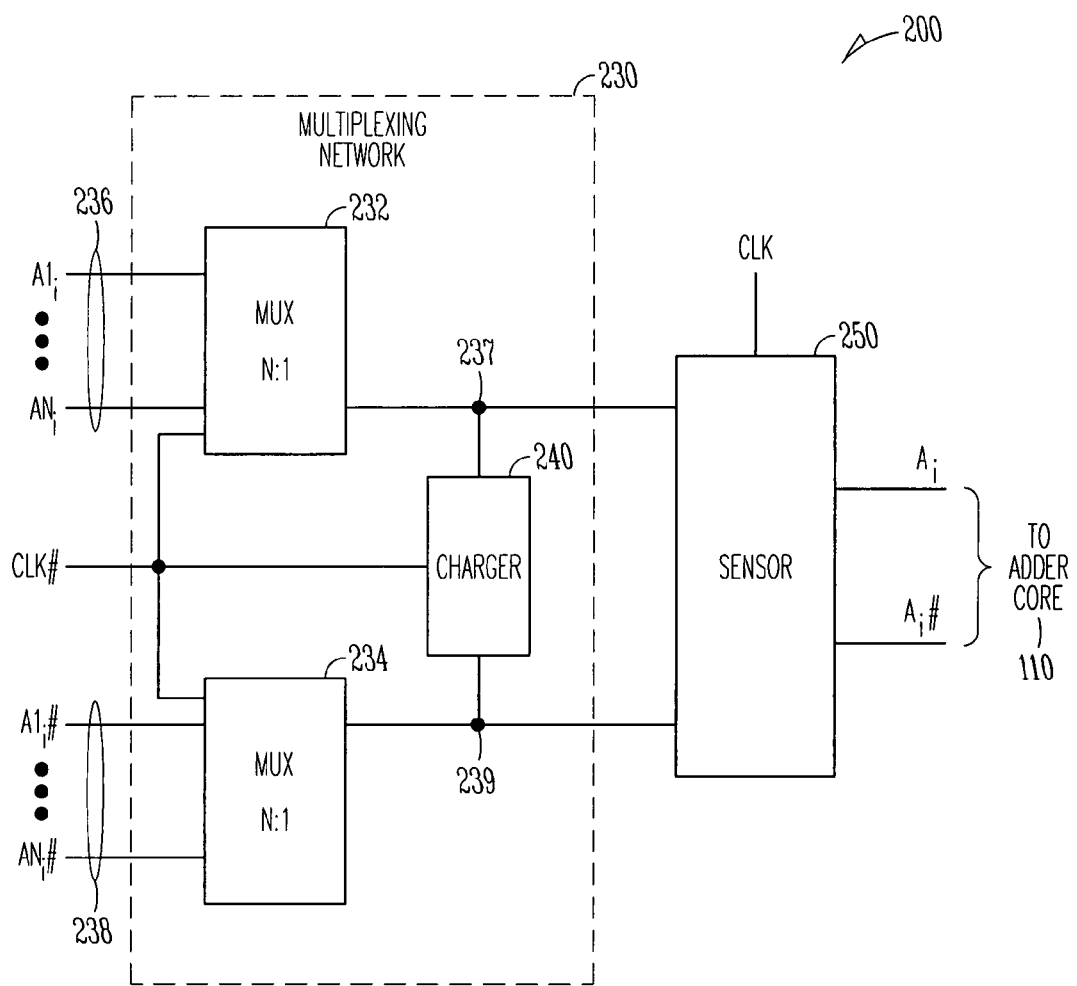
FIG. 2 shows a block diagram of a selector.

FIG. 2 shows a block diagram of a selector. Selector 200 represents selectors 121, 123, 125, and 127 of FIG. 1. Selector 200 includes a multiplexing network 230 and a sensor 250.

Multiplexing network 230 includes a first multiplexer (MUX) 232, a second MUX 234, and a charger 240.

Multiplexing network 230 has many input nodes including a first group of input nodes 236, a second group of input nodes 238, and a pair of multiplexing output nodes 237 and 239. MUX 232 has input nodes connected to nodes 236 and an output node connected to node 237. MUX 234 has input nodes connected to nodes 238 and an output node connected to node 239. Each of the MUX 232 and MUX 234 is an N:1 MUX where N is an integer indicating the number of input values to be selected. Referring back to FIG. 1, if the number of sources A1-AN is five, then MUX 232 is a 5:1 MUX.

MUX 232 receives input values $A1_i$-$AN_i$. $A1_i$ represents one of the $A1_0$-$A1_j$ and $AN_i$ represents one of the $AN_0$-$AN_j$ (FIG. 1). MUX 234 receives input values $A1_i\#$-$AN_i\#$. $A1_i\#$ represents one of the $A1_0\#$-$A1_j\#$ and $AN_i\#$ represents one of the $AN_0\#$-$AN_j\#$ (FIG. 1). $A1_i$ and $A1_i\#$ have complimentary input values. In some embodiments, the complimentary values are based on the values of supply voltage rails or a dual-rail supply voltage such as Vcc and ground. $AN_i$ and $AN_i\#$ also have complimentary input values such as Vcc and ground.

MUX 232 and MUX 234 together select a selected pair of input values. MUX 232 selects one of the $A1_i$-$AN_i$ to be a first selected input value of the selected pair. MUX 234 selects one of the input values $A1_i\#$-$AN_i\#$ to be a second selected input value of the selected pair. MUX 232 and 234 select the selected pair such that the first and second selected input values of the selected pair are related to each other. For example, if MUX 232 selects $A1_0$, then MUX 234 selects $A1_0\#$; if MUX 232 selects $AN_0$, then MUX 234 selects $AN_0\#$. MUX 232 and MUX 234 pass the selected pair of input values to multiplexing output nodes 237 and 239.

Charger 240 charges nodes 237 and 239 to an initial value. The initial value is a known value, for example, zero volts or ground. Charger 240 charges nodes 237 and 239 to the initial value before MUX 232 and 234 pass the selected pair of input values to node 237 and 239. Thus, charger 240 "precharges" nodes 237 and 239.

Sensor 250 performs a sensing operation to sense the differences in values at nodes 237 and 239 to generate the input data $A_i$ and $A_i\#$. Sensor 250 has a first input node connected to node 237 and a second input node connected to node 239. Sensor 250 also has a first output node to generate $A_i$ and a second output node to generate $A_i\#$. In some embodiments, sensor 250 includes a sense amplifier to senses the differences in voltages between nodes 237 and 239 to generate $A_i$ and $A_i\#$. $A_i$ and $A_i\#$ are provided to adder core 110.

Selector 200 also includes control nodes to receive control signal CLK and CLK#. In some embodiments, CLK and CLK# are clock signals and are inverse versions each other. For example, when CLK is low, CLK# is high and when CLK is high, CLK# is low.

The CLK# signal controls multiplexing network 230. In some embodiments, when CLK# is high and CLK is low, a portion of input nodes 236 and 238, and both multiplexing output nodes 237 and 239 are precharged to the initial value. The CLK signal controls sensor 250. In some embodiments, when CLK is high and CLK# is low, sensor 250 is activated to perform a sensing operation to sense the difference in voltages between nodes 237 and 239.

Figure 3:
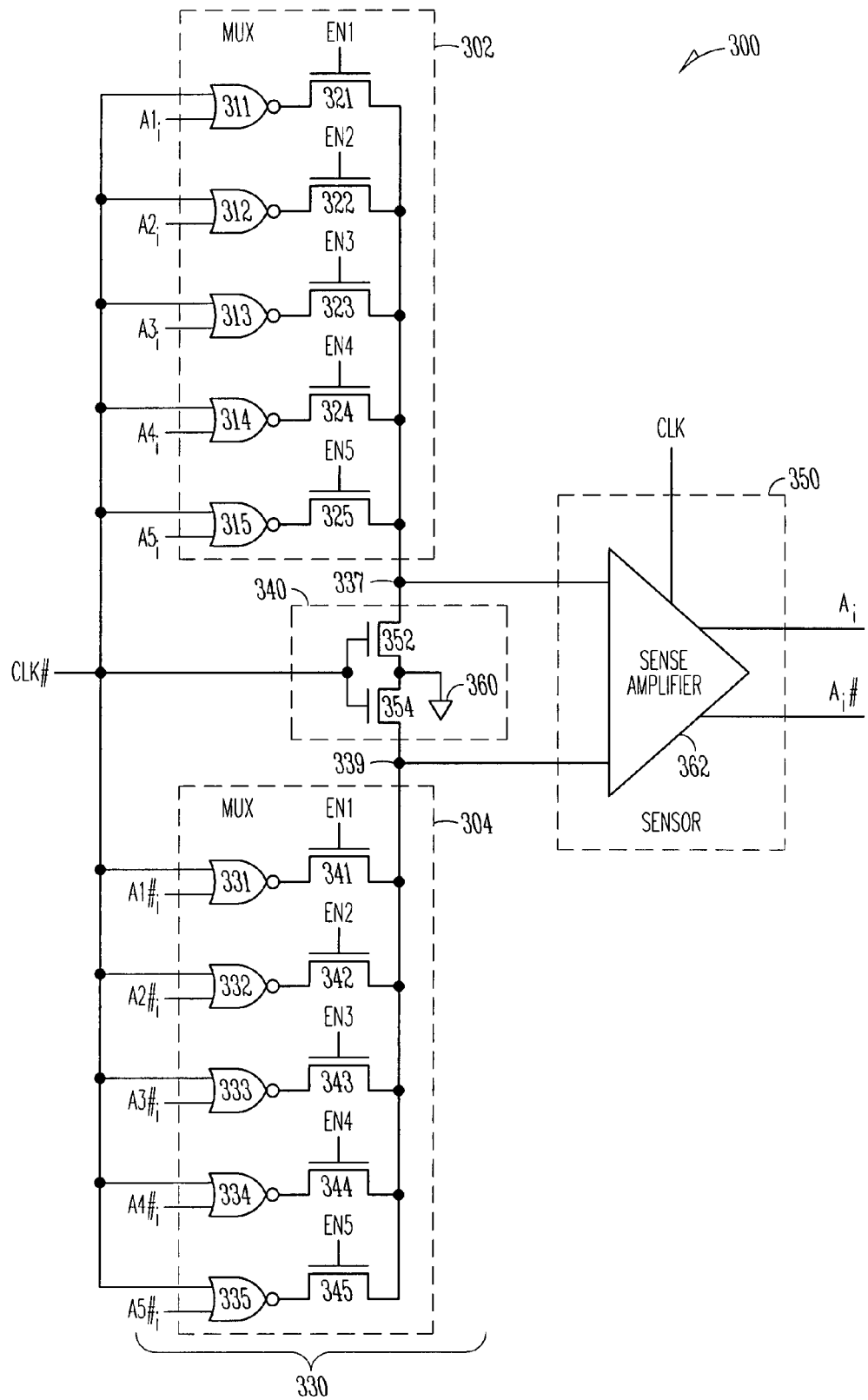
FIG. 3 shows a schematic diagram of a selector.

FIG. 3 shows a schematic diagram of a selector. Selector 300 represents selectors 121, 123, 125, 127 (FIG. 1) and selector 200 (FIG. 2). Selector 300 includes a multiplexing network 330 and a sensor 350. Multiplexing network 330 includes MUX 302, MUX 304, and a charger 340.

MUX 302 has a number of input nodes to receive a number of input values $A1_i$-$A5_i$ ($A1_i$, $A2_i$, $A3_i$, $A4_i$, and $A5_i$).

Each of the $A1_i$-$A5_i$ represents one bit of one source among the sources A1-A5. For example, when index i is zero, $A1_0$ represents the bit at position zero of source A1; and $A5_0$ represents the bit at position zero of source A5. FIG. 3 shows five sources A1-A5 as an example. The number of sources can be different from five.

MUX 302 includes a number of logic gates 311-315 (311, 312, 313, 314, and 315), and a number of switches 321-325 (321, 322, 323, 324, and 325). In FIG. 3, logic gates 311-315 are NOR gates and switches 321-325 are transistors or pass transistors.

Each of the NOR gates 311-315 includes a first input node to receive the CLK# signal and a second input to receive one of the $A1_i$-$A5_i$. Each of the transistors 321-325 connects between an output of a corresponding NOR gate and a multiplexing output node 337. For example, transistor 321 connects between NOR gate 311 and node 337; transistor 325 connects between NOR gate 315 and node 337.

MUX 304 includes elements similar to the elements of MUX 302. MUX 304 has a number of input nodes to receive a number of inputs value $A1_i\#$-$A5_i\#$ ($A1_i\#$, $A2_i\#$, $A3_i\#$, $A4_i\#$, and $A5_i\#$). Input values $A1_i\#$-$A5_i\#$ represent complement bits of input values $A1_i$-$A5_i$ of sources A1-A5. For example, $A1_i\#$ represents the complement of $A1_i$ of source A1; and $A5_i\#$ represents the complement of $A5_i$ of source A5.

MUX 304 includes NOR gates 331-335 and pass transistors 341-345. NOR gates and pass transistors of MUX 304 are arranged in a similar arrangement as that of the NOR gates and the pass transistors of MUX 302. Each of the NOR gates 331-335 includes a first input node to receive the CLK# signal and a second input node to receive one of the $A1_i\#$-$A5_i\#$.

Charger 340 includes a first transistor 352 and a second transistor 354. Transistor 352 connects between node 337 and a supply node 360. Transistor 354 connects between node 339 and supply node 360. The gates of transistors 352 and 354 are controlled by the CLK# signal.

During a precharge time, the CLK# signal is activated high to turn on transistors 352 and 354 to connect both nodes 337 and 339 to node 360. Thus, during the precharge time, the voltage of nodes 337 and 339 are equal to the voltage of node 360. The voltage at node 360 has a known value. Hence, during the precharge time, nodes 337 and 339 are charged or precharged to a known value. This known value is referred to as the initial value. In FIG. 3, node 360 is ground, therefore, nodes 337 and 339 are precharged to ground. In some embodiments, node 360 has a voltage different from ground. Thus, nodes 337 and 339 are precharged to a non-ground potential in some embodiments.

The precharge time of nodes 337 and 339 occurs while transistors 321-325 and 341-345 turn off. After the precharge time, a pair of transistors (one of the transistors 321-325 and one of the transistors 341-345) turn on to pass a pair of selected input values (one of the $A1_i$-$A5_i$ and one of the $A1_i\#$-$A5_i\#$) to nodes 337 and 339.

A number of enable signals EN1-EN5 (EN1, EN2, EN3, EN4, and EN5) control transistors 321-325 of MUX 302 and transistors 341-345 of MUX 304. EN1-EN5 are selectively activated (e.g., high) to turn on or activate a pair of transistors: one transistor from MUX 302 and one transistor from MUX 304. The activated pair of transistors passes the values from the output nodes of a corresponding pair of NOR gates to multiplexing output nodes 337 and 339. The values from the output nodes of the corresponding pair of NOR gates represent the selected pair of input values. For example, when EN1 is activated, transistors 321 of MUX 302 and transistor 341 of MUX 304 turn on and passes the values at the output nodes of NOR gates 311 and 331 to nodes 337 and 339. In this example, the values passed to nodes 337 and 339 represent the values of $A1_i\#$-$A5_i\#$.

Sensor 350 includes a sense amplifier 362. Sense amplifier 362 includes a first sensing input node connected to node 337, and a second sensing input node connected to node 339. Sense amplifier 362 also includes a first sensing output node to generate $A1_i$ and a second sensing output node to generate $A1_i\#$. Sense amplifier 362 further includes a control node to receive the CLK signal. The output nodes, which carry input data bits $A_i$ and $A_i\#$, of sense amplifier 362 are precharged to an initial value, for example, low or ground.

An evaluation time occurs after the precharging time at nodes 337 and 339 and after the pair of selected input values are passed to nodes 337 and 339. During the evaluation time, sense amplifier 362 is activated by the CLK signal. For example, sense amplifier 362 is activated when CLK is high and CLK# is low. When activated, sense amplifier 362 performs a sensing operation to sense the differential voltage at nodes 337 and 339 and generates $A_i$-$A_i\#$. $A_i$-$A_i\#$ are provided to adder core 110 for further data processing.

The combination of multiplexing network 330 and the sense amplifier 362 acts as a storage element (e.g., a latch) to hold the states of the input data inputted to adder core 110 (FIG. 1) while adder core 110 is in evaluation. For example, when CLK is high and CLK# is low, multiplexing network 330 and sense amplifier 362 act to hold the states of a pair of selected input values among $A1_i$-$A5_i$ and $A1\#_i$-$A5\#_i$. The pair of selected input values held at the input of adder core 110 is represented by $A_i$-$A_i\#$. In some embodiments, a storage element such as a latch or a flip-flop may be used to hold the value to be inputted to adder core 110. In FIG. 3, since the combination of multiplexing network 330 and the sense amplifier 362 acts as a storage element, an explicit storage element at the input of adder core 110 is eliminated. Elimination of a latch at the input of the adder core may reduce propagation delay time of input signal to the adder core and may also reduce power consumption.

Figure 4:
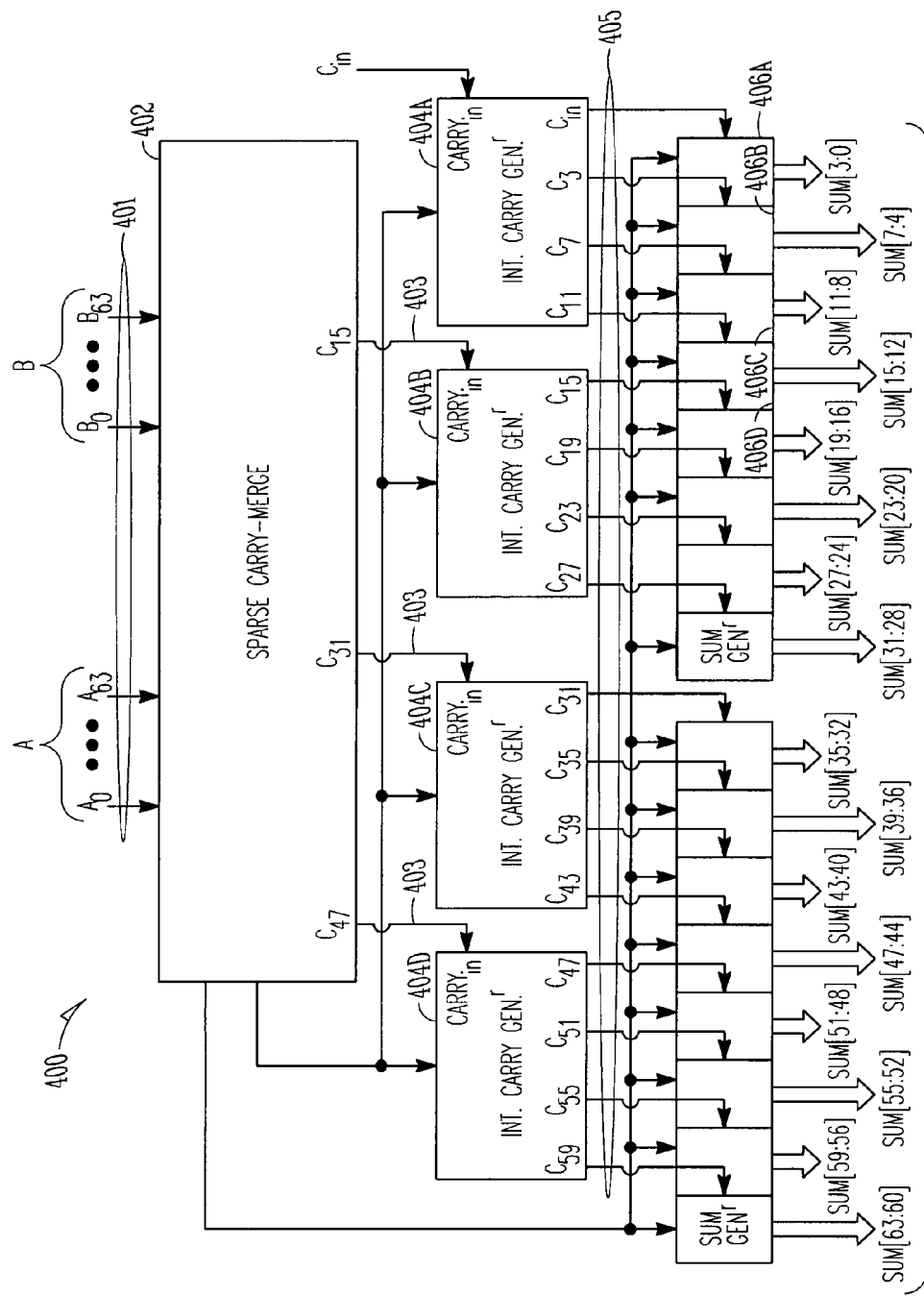
FIG. 4 shows a circuit diagram of an adder.

FIG. 4 shows an adder. Adder 400 represents an exemplary implementation of one of the adders 101 and 103 of FIG. 1. Adder 400 is one implementation of a domino adder. Other implementations of a domino adder or other types of adder may be used. Thus, input data such as $A_0$-$A_j$, $A_0\#$-$A_j\#$, $B_0$-$B_j$, $B_0\#$-$B_j$ provided by input segments 120 and 122 of FIG. 1 may feed any type of adder.

Adder 400 sums two numbers A and B. Each of the numbers A and B has multiple bits. For example, A has 64 bits including $A_0$-$A_{63}$ and B has 64 bits including $B_0$-$B_{63}$. $A_0$-$A_{63}$ and $B_0$-$B_{63}$ represent $A_0$-$A_j$ and $B_0$-$B_j$ of FIG. 1.

Adder 400 includes sparse carry-merge generator 402 having a number of sparse carry-merge input nodes 401 to receive the bits of the numbers A and B. In FIG. 4, since each of the numbers A and B has 64 bits, sparse carry-merge generator 402 includes 128 sparse carry-merge input nodes to receive 128 bits of both of the numbers A and B. Sparse carry-merge generator 402 generates a predetermined number or group of first carries or first carry signals, $C_{15}$, $C_{31}$ and $C_{47}$ at a number of sparse carry-merge output nodes 403. Sparse carry-merge generator 402 generates one (1) in sixteen (16) carries or generates one (1) carry for each group of sixteen (16) bits of the 64 bit numbers grouping the bits together starting with a least significant digit or bit zero (0), $A_0$ and $B_0$. Accordingly, for the 64 bit adder 400 the three carries $C_{15}$, $C_{31}$ and $C_{47}$ are generated.

A plurality intermediate carry generators 404 (404A-404D) couple to sparse carry-merge generator 402 to generate a predetermined number of second carries or the missing one (1) in four (4) carries or carry signals from the predetermined number or group of first carries. The predetermined number of second carries are generated at a number of intermediate carry output nodes 405. Accordingly, a first intermediate carry generator 404A generates missing 1 in 4 carries $C_3$, $C_7$, and $C_{11}$, using a carry-in ($C_{in}$) which is passed through the first intermediate carry generator 404A. $C_{in}$ can be a 0 or a 4. Second intermediate carry generator 404B generates missing 1 in 4 carries $C_{19}$, $C_{23}$, and $C_{27}$ using carry $C_{15}$ from the number of first carries as a carry-in as described in more detail below. The third intermediate carry generator 404C generates missing 1 in 4 carries $C_{35}$, $C_{39}$, and $C_{43}$ using carry $C_{31}$ as a carry-in. The fourth intermediate carry generator 404D generates missing 1 in 4 carries $C_{51}$, $C_{55}$ and $C_{59}$ using $C_{47}$ as a carry-in. Thus, the intermediate carry generators 404A-404D generate the additional carries such that one carry is generated for every group of four bits of the two numbers, grouping the bits together beginning with the least significant digit or bit 0.

Adder 400 further includes a plurality of sum generators 406 (e.g., 406A-406D) coupled to the intermediate sum generators 404 and sparse carry-merge generator 402 to provide a final sum 408 of the two numbers A and B. As described in more detail below, each of the sum generator 406A-406D computes a sum for a group of four bits of the two numbers A and B using one of the one in four carries (or one of the predetermined number of first and second carries). For example, the first conditional sum generator 406A computes a Sum(3:0) generated from bits 0-3 of the two numbers A and B using carry-in ($C_{in}$). Similarly, the second conditional sum generator 406B computes a Sum(7:4) generated from bits 4-7 of the two numbers using carry $C_3$ as the carry-in and so forth for the other conditional sum generators 406 shown in FIG. 4.

Figure 5:
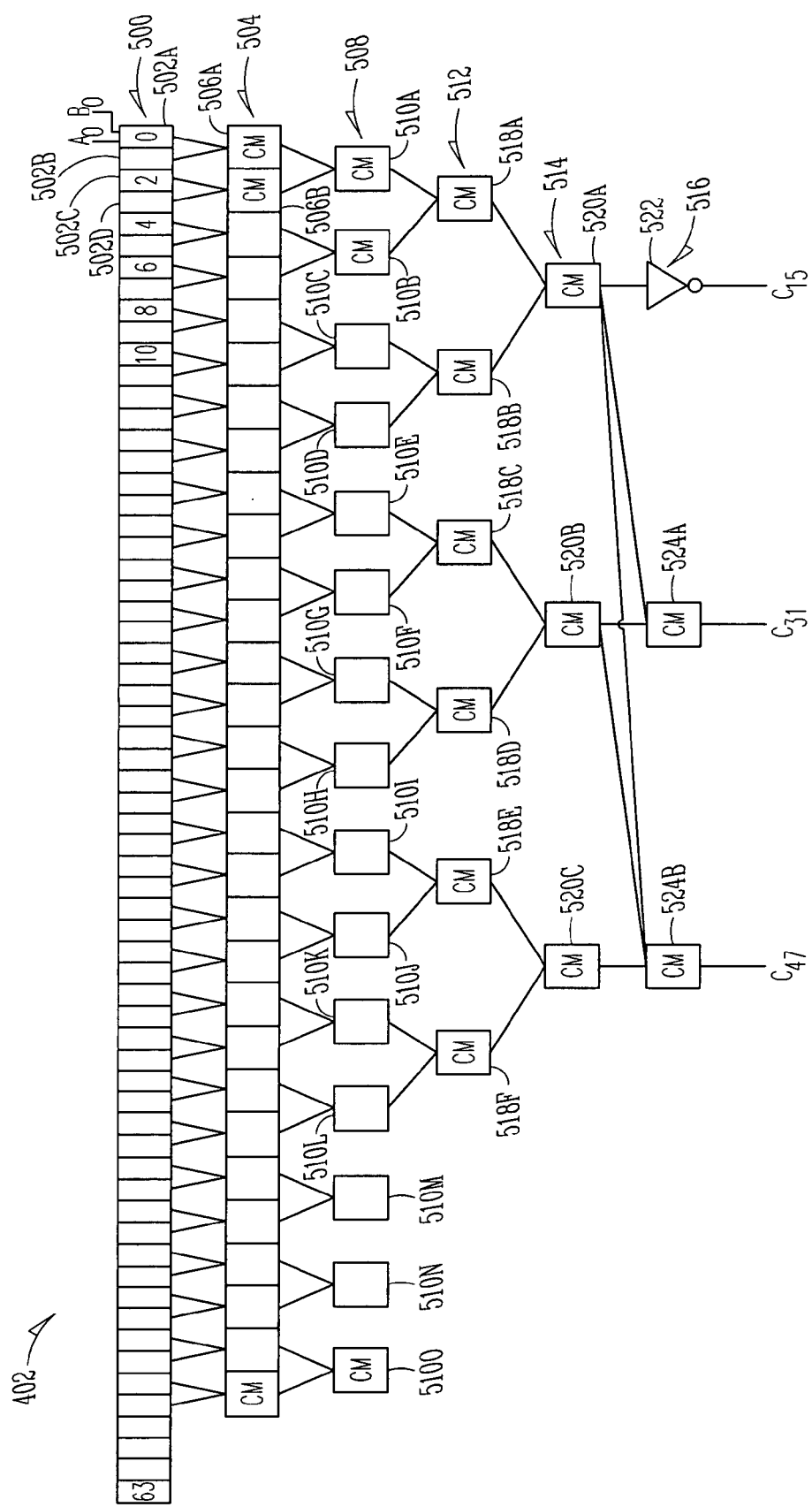
FIG. 5 shows a circuit diagram of a sparse carry-merge generator.

FIG. 5 shows a circuit diagram of sparse carry-merge generator 402 of FIG. 4. In FIG. 5, sparse carry-merge generator 402 includes a first stage 500. The first stage 500 includes a plurality of logic segments or logic gates 502 (e.g., 502A-502D), represented by the blocks in FIG. 5, to generate a plurality of propagate signals $P_i$ (where i=0, 1, to 63) and a plurality of generate signals $G_i$ (where i=0, 1, to 63).

The two numbers A and B together have sixty four pairs of bits. Each of the logic gates 502 includes a pair of input nodes to receive a pair of bits or two bits: a first bit from A and a second bit from B; the two bits are from corresponding position. For example, logic gate 502A receives $A_0$ and $B_0$. Each of the logic gates 502 performs an "exclusive OR" logic operation on each pair of bits and performs an "AND" logic operation on each pair of bits. The exclusive OR logic operation generates $P_i$ ($P_i$=$A_i \oplus B_i$). The AND logic operation generates $G_i$ ($G_i$=$A_i \cdot B_i$).

Sparse carry-merge generator 402 also includes a second stage 504 including a plurality of carry-merge (CM) logic gates 506 (e.g., 506A and 506B), represented by the blocks in FIG. 5. Each of the CM logic gates 506 is coupled to two adjacent logic gates 502 of the first stage 500 to merge the two propagate signals ($P_i$ and $P_{i-1}$) and the two generate signals ($G_i$ and $G_{i-1}$) from the two adjacent logic gates 502 of the first stage 500. Each of the CM logic gates outputs propagate signal Pout and generate signal $G_{out}$. $P_{out}$=$P_i \cdot P_{i-1}$. $G_{out}$=$G_i$+$P_i \cdot G_{i-1}$. Accordingly, the first CM logic gate 506A merges the $P_0$ and $G_0$ of logic gate 502A and $P_1$ and $G_1$ of logic gate 502B. Similarly, the second CM logic gate 506B merges $P_2$ and $G_2$ of from logic gate 502C with the $P_3$ and $G_3$ of logic gate 502D. Each of the CM logic gates 506 in the second stage 504 merges other $P_i$ and $G_i$ from other logic gates 502 in a similar pattern as that of CM logic gates 506A and 506B.

Sparse carry-merge generator 402 also includes a third stage 508 coupled to the second stage 504 of the generator 402. The third stage 508 includes a second plurality of CM logic gates 510 (510A-510O). Similar to the relationship of the second stage 504 and the first stage 500, each of the CM gates 510 is coupled to two adjacent CM logic gates 506 to merge $P_i$ and $P_{i-1}$ and $G_i$ and $G_{i-1}$ from the two adjacent CM logic gates 506.

Sparse carry-merge generator 402 further includes a fourth stage 512, a fifth stage 514 coupled to the fourth stage 512 and a sixth stage 516 coupled to the fifth stage 514 to generate the 1 in 16 carries $C_{15}$, $C_{31}$ and $C_{47}$ for the two numbers A and B.

The fourth stage 512 includes a plurality of CM logic gates 518 (518A-518F). Each of the CM logic gates 518 is coupled to two adjacent CM logic gates 510 to merge $P_i$ and $P_{i-1}$ and $G_i$ and $G_{i-1}$ from the two adjacent CM logic gates 510. Thus, CM gate 518A merges the signals from CM gates 510A and 510B. CM gate 518B merges signals from CM gates 510C and 510D, and so forth for the other CM gates 518.

Similarly, the fifth stage 514 includes a plurality of CM gates 520 (520A-520C). Each of the CM gates 520 is coupled to two adjacent CM gates 518 to merge $P_i$ and $P_{i-1}$ and $G_i$ and $G_{i-1}$ from each pair of adjacent CM gates 518.

The sixth stage 516 includes an inverter 522 and two CM gates 524A and 524B. The inverter 522 is coupled to the first CM gate 520A. The output signal of the inverter 522 provides the first 1 in 16 carry $C_{15}$. CM gate 524A is coupled to CM gate 520A and CM gate 520B. CM gate 524A merges $P_i$ and $G_i$ from CM gate 520B with $G_{i-1}$ from CM gate 520A to provide $C_{31}$. CM gate 524B is coupled to CM gate 520A, CM gate 520B, and CM gate 520C. CM gate 524B merges $P_i$ and $G_i$ from CM gate 520C with $G_{i-1}$ from CM gate 520B and $G_{i-2}$ from CM gate 520A to provide $C_{47}$.

Figure 6:
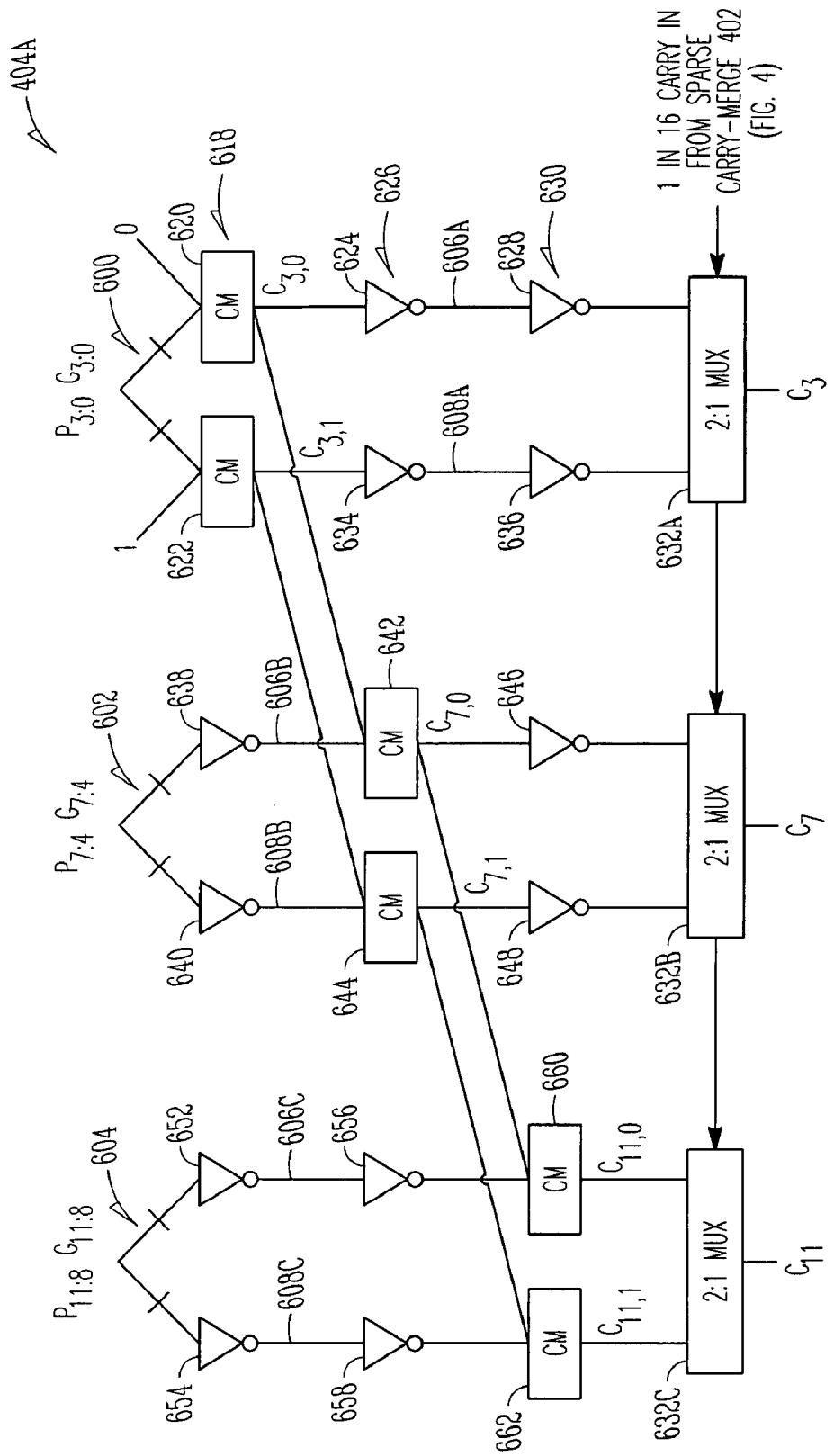
FIG. 6 shows a circuit diagram of an intermediate carry generator.

FIG. 6 shows a circuit diagram of an example of an intermediate carry generator 404A of FIG. 4. The structure and operation of the other intermediate carry generators 404B, 404C, and 404D of FIG. 4 is analogous to that described with respect to the first intermediate carry generator 404A. Intermediate carry generators 404 receives respective, merged propagate signals and merged generate signals from the third stage 508 (FIG. 5) of sparse carry-merge generator 402 to generate additional carries or the missing 1 in 4 carries.

In FIG. 6, the first intermediate carry generator 404A includes a first carry generate circuit 600, a second carry generate circuit 602, and a third carry generate circuit 604. Each of the carry generate circuits 600, 602 and 604 includes two rails or sub-circuits 606 and 608 to generate a pair of conditional carries in each circuit 600, 602 and 604. The first rails 606 of each circuit 600, 602 and 604 generate a conditional carry assuming a logic 0 carry-in signal to intermediate carry generator 404A. The second rails 608 of each circuit 600, 602 and 604 generate an associated conditional carry assuming a logic 1 carry-in signal to intermediate carry generator 404.

Intermediate carry generator 404A further includes 6 stages of ripple-carry logic formed by the first and second rails 606 and 608 of the circuits 600, 602, and 604. A first stage 618 of the first circuit 600 of intermediate carry generator 404A receives a propagate signal $P_{3:0}$ and an associated generate signal $G_{3:0}$ from the third stage 508 (FIG. 5) of sparse carry-merge generator 402. The propagate signal $P_{3:0}$ and the associated generate signal $G_{3:0}$ is generated in sparse carry-merge generator 402 by merging bits 0-3 of the two numbers A and B as previously described.

A first CM gate 620 in the first rail 606A of the first circuit 600 merges the propagate signal $P_{3:0}$ and the associated generate signal $G_{3:0}$ with the assumed logic 0 carry-in signal in the first stage 618 to generate a resulting conditional carry in the first stage 618 to generate a resulting conditional carry $C_{3,0}$. A second CM gate 622 of the first circuit 600 in the second rail 608A merges the propagate signals $P_{3:0}$ and the associated generate signal $G_{3:0}$ with the assumed logic 1 carry-in to generate a resulting conditional carry $C_{3,1}$ in the first stage 618 of the first circuit 600.

The first CM gate 620 is coupled to a first inverter 624 in a second stage 626 of the first rail 606A of intermediate carry generator 404A. The first inverter 624 is coupled to a second inverter 628 in a third stage 630 of intermediate carry generator 404A. The second inverter 628 is coupled to a 2:1 multiplexer 632A. Similarly, the second CM gate 622 is coupled to a first inverter 634 of the second rail 608A in the second stage 626. The first inverter 634 is coupled to a second inverter 636 of the second rail 608A in the third stage 630. The second inverter 636 is coupled to the multiplexer 632A.

The multiplexer 632A receives a carry-in ($C_{in}$ in FIG. 4) and selects the first rail 606A or the second rail 608A to provide the missing 1 of 4 carries of the predetermined number of second carries. For the first carry generate circuit 600, the missing 1 of 4 carries is designated $C_3$.

The second circuit 602 receives $P_{7:4}$ and merged $G_{7:4}$ from stage 508 (FIG. 5) of sparse carry-merge generator 402. $P_{7:4}$ and $G_{7:4}$ are generated from bits 4-7 of the two numbers A and B in the same manner as that described above for signals $P_{3:0}$ and $G_{3:0}$. The signals $P_{7:4}$ and $G_{7:4}$ are inverted in the first stage 618 by an inverter 638 in the first rail 606B and by an inverter 640 in the second rail 608B. In the second stage 626, the first rail 606B includes a first CM gate 642. The second rail 608B includes a second CM gate 644.

The first CM gate 642 is coupled to the first inverter 638 and to the first CM gate 620 of the first circuit 600. The first CM gate 642 merges the inverted $P_{7:4}$ and $G_{7:4}$ signals with the conditional carry $C_{3,0}$ from the first CM gate 620 of the first circuit 600 to generate a first conditional carry $C_{7,0}$. The second CM gate 644 merges the inverted $P_{7:4}$ and $G_{7:4}$ signals with the conditional carry $C_{3,1}$ from the second CM gate 622 of the first circuit 600 to generate a second conditional carry $C_{7,1}$.

The third stage 630 of the second circuit 602 includes an inverter 646 in the first rail 606B coupled to CM gate 642 and another inverter 648 in the second rail 608B coupled to the second CM gate 644. The outputs of both inverters 646 and 648 are coupled to a 2:1 multiplexer 632B. As with the first circuit 600, the multiplexer 632B selects between the conditional signals generated by the first rail 606B and the second rail 608B in response to one of the carry-in signals of the first predetermined number of carries or in response to one of the 1 in 16 carries from sparse carry-merge generator 402 to provide a second one of the missing 1 in 4 carries of the predetermined number of second carries. For the second circuit 602, the missing 1 in 4 carry is designated $C_7$.

The third circuit 604 receives $P_{11:8}$ and $G_{11:8}$ from the third stage 508 (FIG. 5) of sparse carry-merge generator 402. $P_{11:8}$ and $G_{11:8}$ are generated from bits 8-11 of the two numbers A and B in the same manner as that described above for signals $P_{3:0}$, $G_{3:0}$ and $P_{7:4}$, $G_{7:4}$.

The first and second stages 620 and 626 of the first rail 606C and the second rail 608C of the third circuit 604 are inverters 652, 654, 656 and 658. The third stage 630 of the third circuit 604 includes a first CM gate 660 in the first rail 606C and a second CM gate 662 in the second rail 608C.

The first CM gate 660 is coupled to the inverter 656 and to the first CM gate 642 in the second stage 626 of the second circuit 602. The second CM gate 662 is coupled to the inverter 658 and the second CM gate 644 of the second circuit 602. the first CM gate 660 merges $P_{11:8}$ and $G_{11:8}$ with the conditional carry $C_{7,0}$ from the first CM gate 642 of the second circuit 602 to generate a first conditional carry $C_{11,0}$. The second CM gate 662 merges the $P_{11:8}$ and $G_{11:8}$ signals with the conditional carry $C_{7,1}$ from the second CM gate 644 of the second circuit 602 to generate a second conditional carry $C_{11,1}$.

The first CM gate 660 and the second CM gate 662 are each coupled to a 2:1 multiplexer 632C. Similar to circuits 600 and 602, the multiplexer 632C selects between the conditional signals generated by the first rail 606C and the second rail 608C to provide a third one of the second predetermined number of carries or a third one of the missing 1 in 4 carries. For circuit 604, the missing 1 in 4 carry is designated $C_{11}$.

As previously discussed, intermediate carry generators 404B, 404C and 404D have a similar structure as that of intermediate carry generator 404A. Intermediate carry generators 404B, 404C and 404D operate in a manner similar to that of intermediate carry generator 404A. Intermediate carry generators 404A-D collectively generate the predetermined number of second carries or the missing 1 in 4 carries as illustrated in FIG. 4. Intermediate carry generator 404A generates carries $C_3$, $C_7$ and $C_{11}$ as described above. Similarly to intermediate carry generator 404A, intermediate carry generator 404B generates carries $C_{19}$, $C_{23}$ and $C_{27}$. Intermediate carry generator 404C generates carries $C_{35}$, $C_{39}$ and $C_{43}$. Intermediate carry generator 404D generates carries $C_{51}$, $C_{55}$ and $C_{59}$.

As described with reference to FIG. 6, CM logic gates 620, 622, 642, 644, 660 and 662 are in a lower or later stage 618, 626 and 630 in each subsequent circuit 600, 602 and 604 to define the ripple carry-merge logic for generating the two rails of conditional 1 in 4 carries in each circuit 600, 602 and 604.

Figure 7:
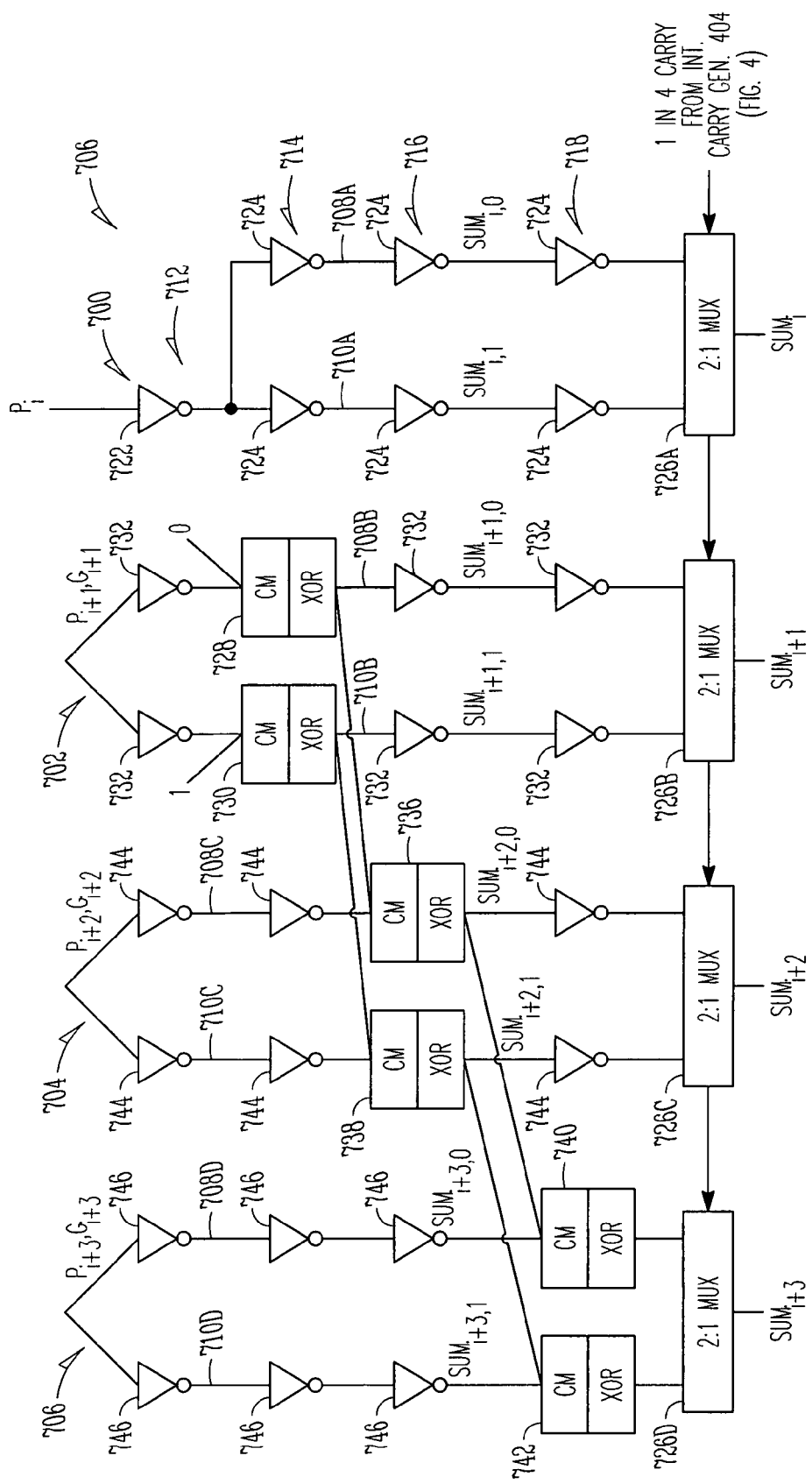
FIG. 7 shows a circuit diagram of a condition sum generator.

FIG. 7 shows a circuit diagram of an example of a single conditional sum generator 406 (e.g., 406A) of FIG. 4. In FIG. 7, the sum generator 406 includes four circuits 700, 702, 704 and 706. Each of the circuit 700, 702, 704 and 706 includes a first rail 708 and a second rail 710 and has four stages 712, 714, 716 and 718. The sum generator 406 is also arranged in a ripple carry-merge structure similar to intermediate carry gate 404A of FIG. 6.

The first stage 712 of the first circuit 700 includes an inverter 722 that is coupled to the first rail 708A and to the second rail 710A. The other stages 714, 716 and 718 of the first circuit 700 also include inverters 724 in the first and second rails 708A and 710A. The inverter 722 of first stage 712 of the first circuit 700 receives $P_i$ from the first stage 500 (FIG. 5) of sparse carry-merge generator 402. The first rail 708A generates a first conditional sum, $sum_{i,0}$. The second rail 710A generates a second conditional sum, $sum_{i,1}$. The inverters 724 of the fourth stage 718 of each rail 708A and 710A are both coupled to a 2:1 multiplexer 726A.

The multiplexer 726A selects between the conditional sums, $sum_{i,0}$ and $sum_{i,1}$ of the first rail 708A and the second rail 710A in response to one of the 1 in 7 carries or one of the predetermined number of combined first and second carries to provide a final sum, $sum_i$. For example, referring back to FIG. 4, for the final sums where i equals zero (0) the carry-in is $C_{on}$ and the $P_i$ input signal to the circuit 700 is $P_0$ from the first stage 500 (FIG. 5) of sparse carry-merge generator 402.

The second circuit 702 includes a first combination CM/exclusive OR logic gate 728 in the second stage 714 of the first rail 708B and a second combination CM/exclusive OR logic gate 730 in the second stage 714 of the second rail 710B. The first stage 712, third stage 716 and fourth stage 718 of the first and second rails 708B and 710B of the second circuit 702 include inverters 732. The first combination CM/exclusive OR logic gate 728 merges $P_{i+1}$ and $G_{i+1}$ with an assumed logic 0 carry-in to generate a conditional sum, $sum_{i+1,0}$. The second combination CM/exclusive OR gate 730 merges $P_{i+1}$ and $G_{i+1}$ with an assumed logic 1 carry-in to generate a conditional sum, $sum_{i+1,1}$. The inverters 732 of the fourth stage 718 of the second circuit 702 are both coupled to a 2:1 multiplexer 726B. The multiplexer 726B selects between the two conditional sums, $sum_{i+1,0}$ and $sum_{i+1,1}$, generated by the first and second rails 708B and 710B of the second circuit 702 in response to one of the 1 in 7 carries to provide the final sum, $sum_{i+1}$.

The third circuit 704 and the fourth circuit 706 have similar structures to the first and second circuits 700 and 702 except the third circuit 704 has a first CM/exclusive OR gate 736 and a second CM/exclusive OR gate 738 in the third stage 716, and the fourth circuit 706 has a first CM/exclusive OR gate 740 and a second CM/exclusive OR gate 742 in the fourth stage 718. All of the other stages of the first and second rails 708 and 710 of the third and fourth circuits 704 and 706 include inverters 744 and 746, respectively.

As with the second circuit 702, each of the CM/exclusive OR gates 736, 738, 740 and 742 are coupled to the inverter 744 and 746, respectively, of the preceding stage and to CM/exclusive OR gate 728, 730, 736 or 738 in the corresponding first or second rail 708 or 710 of the preceding circuit. The fourth stage 718 of each of the third and fourth units 704 and 706 are coupled to respective 2:1 multiplexers 726C and 726D. The multiplexers 726C and 726D select between the conditional sums ($sum_{i+2,0}$ or $sum_{i+2,1}$ and $sum_{i+3,0}$ or $sum_{i+3,1}$) to provide the final sums, $sum_{i+2}$ and $sum_{i+3}$, in response to the appropriate 1 in 7 carry as a function of the order of the bits being summed as shown in FIG. 4. For example, for final sums, Sum(63:60), the 1 in 7 carry or $carry_{in}$ is $C_{59}$ from FIG. 4. For final sums, Sum(31:28), the 1 in 7 carry is $C_{27}$ and so forth for the other final sums.

Figure 8:
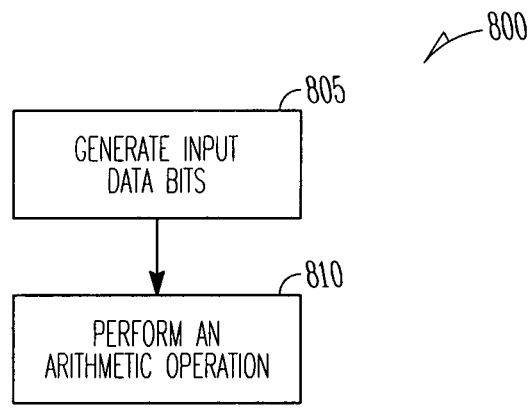
FIG. 8 is a flowchart of a method of performing operations on numbers.

FIG. 8 is a flowchart of a method of performing operations on numbers. Method 800 provides numbers to an adder. The adder adds the numbers. Each of the numbers is a binary number having multiple bits.

Box 805 generates input data bits representing the bits of two numbers. The input data bits may be generated by selecting among a number of input values. The selection of the input values is similar to that of FIG. 1-FIG. 3. Thus, one or more input segments such as input segment 120 or 122 (FIG. 1) may be used during the selection of the input values in box 805. Therefore, at least one input segment used in box 805 may include a number of selectors such as selectors 121, 123 (FIG. 1) and selector 200 (FIG. 2).

Box 810 performs an arithmetic operation on the input data bits. An adder such as adder 400 of FIG. 4 may be used to perform the arithmetic operation. Thus, the arithmetic operation in box 810 is similar to the operation described in FIG. 4-FIG. 7.

Figure 9:
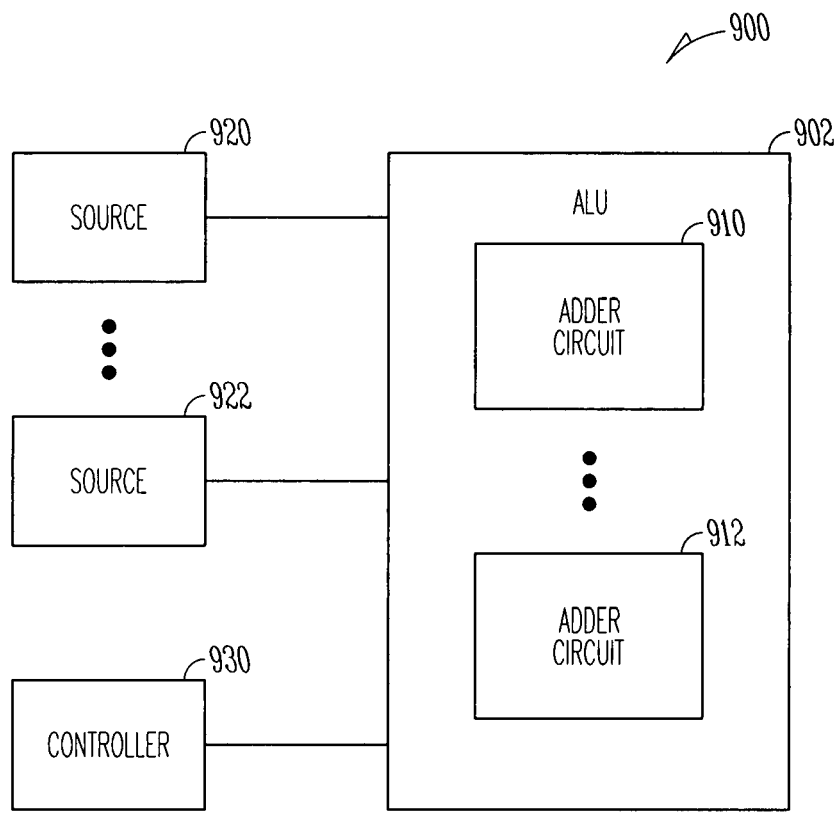
FIG. 9 shows an integrated circuit.

FIG. 9 shows an integrated circuit 900. Integrated circuit 900 may be any integrated circuit as a processor, a microprocessor, a memory device, a memory controller, a graphic controller, an instruction specific integrated circuit, or other types of integrated circuits. Integrated circuit 900 includes an arithmetic logic unit (ALU) 902 including a number of adder circuits 910 and 912. Each of the adder circuits 910 and 912 may be adder circuit 100 of FIG. 1. Adder circuits 910 and 912 perform arithmetic operation data provided by a number of sources 920 and 922.

Sources 920 and 922 represent other circuits or components of integrated circuits 900 such as memory units and registers. Sources 920 and 922 provide input values to ALU 902. Examples of the input values provided by sources 920 and 922 are similar to that of FIG. 1 such as input values $A1_0$-$A1_j$, $A1_0\#$-$A1_j\#$, $AN_0$-$AN_j$, $AN_0\#$-$AN_j\#$, $B1_0$-$B1_j$, $B1_0\#$-$B1_j\#$, $BM_0$-$BM_j$, and $BM_0\#$-$BM_j\#$.

Integrated circuit 900 further includes a controller 930 to provide control signals to ALU 902. Examples of the control signals provided controller 930 include the EN1-EN5, CLK, and CLK# signals of FIG. 1.

Figure 10:
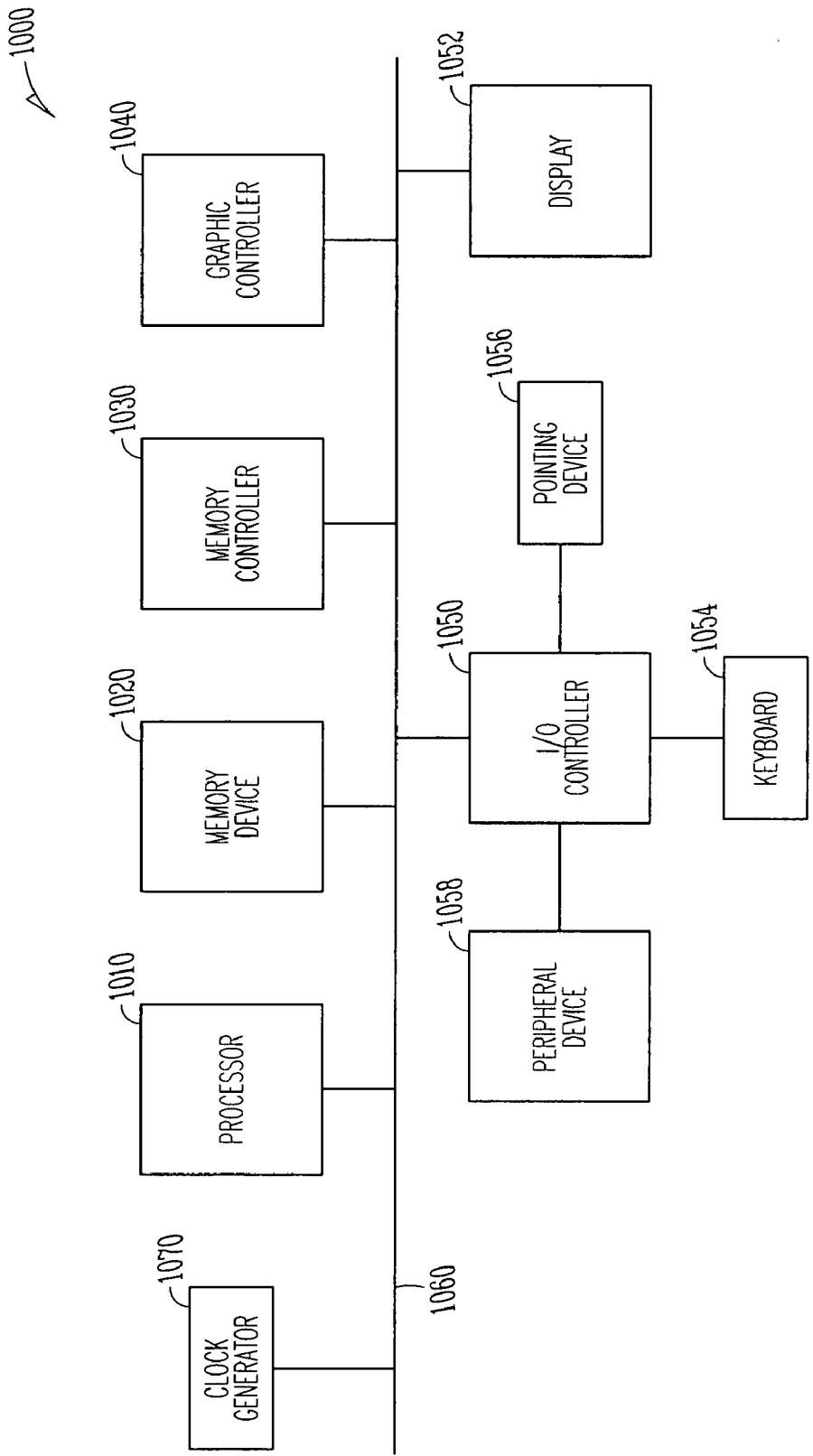
FIG. 10 shows a system.

FIG. 10 shows a system 1000. System 1000 includes a processor 1010, a memory device 1020, a memory controller 1030, a graphic controller 1040, an input and output (I/O) controller 1050, a display 1052, a keyboard 1054, a pointing device 1056, and a peripheral device 1058. A bus 1060 connects all of these devices together. A clock generator 1070 provides an external signal EXT_CLK to at least one of the devices of system 1000 via bus 1060. Example of clock generator 1070 includes an oscillator in a circuit board such as a motherboard. Two or more devices shown in system 1000 may be formed in a single chip.

At least one of the devices shown in system 1000 includes an adder circuit such as adder circuits 110, 910 and 912 described in FIG. 1-FIG. 9.

Bus 1060 may be interconnect traces on a circuit board or may be one or more cables. Bus 1060 may also connect the devices of system 1000 by wireless means such as by electromagnetic radiation, for example, radio waves. Peripheral device 1058 may be a printer, an optical device such as CD-ROM and DVD reader and writer, a magnetic device reader and writer such as a floppy disk driver, or an audio device such as a microphone.

Memory device 1020 may be a dynamic random access memory (DRAM) device. Examples of DRAM devices include synchronous DRAM commonly referred to as SDRAM, SDRAM II, SGRAM (Synchronous Graphics Random Access Memory), DDR SDRAM (Double Data Rate SDRAM), DDR II SDRAM, DDR III SDRAM, GDDR III SDRAM (Graphic Double Data Rate), and Rambus DRAMs. Memory device 1020 may also be a static random access memory (SRAM) device, or may be a flash memory.

System 1000 represented by FIG. 10 includes computers (e.g., desktops, laptops, hand-helds, servers, Web appliances, routers, etc.), wireless communication devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

What is claimed is:

1. A circuit comprising:
   a plurality of selectors, each of the selectors including a multiplexing network to select a pair of input values from among a plurality of input values, each of the selectors also including a sense amplifier coupled to the multiplexing network to generate at least one input data bit based on the pair of input values, a first multiplexer to select from a first group of input values of the plurality of input values to provide a first input value of the pair of input values, and a second multiplexer to select from a second group of input values of the plurality of input values to provide a second input value of the pair of input values; and
   an arithmetic unit coupled to the sense amplifier to perform an arithmetic operation on the at least one input data bit, wherein the arithmetic unit includes:
      a sparse carry-merge generator to generate a first number of carry signals based on the plurality of second input data bits and the least one input data bit from the sense amplifier of each of the selectors;
      a plurality of intermediate carry generators coupled to the sparse carry merge generator to generate a second number of carry signals; and
      a plurality of conditional sum generators coupled to the sparse carry-merge generator and the plurality of intermediate carry generators and to provide a sum of a first number represented by a combination of least one input data bit of each of the sense amplifiers from each of the selectors and a second number represented by the second input data bits; and
   a second plurality of selectors coupled to the arithmetic unit to provide a plurality of second input data bits to the arithmetic unit.

2. The circuit of claim 1, wherein the multiplexing network further includes a charger coupled to output nodes of the multiplexing network to charge the output nodes to an initial value.

3. The arithmetic unit of claim 1, wherein the sparse carry-merge generator includes a number of logic segments to generate one carry signal for a combination of input data bits from at least two of the selectors and from at least two of the second input data bits.

4. A circuit comprising:
   a multiplexing network including a first multiplexer and a second multiplexer, the first multiplexer having first input nodes to receive a plurality of first input values and a first multiplexing output node, the second multiplexer having a second multiplexing output node and second input nodes to receive a plurality of second input values, wherein each of the second input values is a complementary value of one of the first input values, wherein the multiplexing network passes a selected first input value of the first input values and a selected second input value of the second input values to the first and second multiplexing output nodes when the selected first and second input values are selected by the first and second multiplexers;
   a sensor having input nodes coupled to the first and second multiplexing output nodes to receive the selected first and second input values to generate a first input data bit and a second input data bit, wherein a value of the first input data bit corresponds to one of the first input values, and wherein a value of the second input data bit corresponds to one of the second input values, the sensor also having output nodes to provide the first and second input data bits; and
   an adder coupled to the output nodes of the sensor to receive the first input data bit to generate a sum of the first input data bit and an additional data bit.

5. The circuit of claim 4, wherein the adder includes:
   a sparse carry-merge generator including a number of sparse carry-merge input nodes to receive a number of bits of a first number and a number of bits of a second number, the sparse carry-merge generator also including a number of sparse carry-merge output nodes to generate a number of first carry signals based on the number of bits of the first and second numbers, wherein the number of sparse carry-merge output nodes is less than one-sixteenth of the number of spare carry-merge input nodes;

a plurality of intermediate carry generators coupled to the sparse carry merge generator and including a number of intermediate carry output nodes to generate a number of second carry signals, wherein the number of intermediate carry output nodes is greater than the number of sparse carry-merge output nodes; and a plurality of conditional sum generators coupled to the sparse carry-merge generator and the plurality of intermediate carry generators and to provide output signals representing a sum of the first and second numbers.

6. The adder of claim 5, wherein the sparse carry-merge generator includes a number of logic segments coupled to the number of sparse carry-merge input nodes, each of the logic segments including two input nodes to receive two input data bits, wherein each of the sparse carry-merge output nodes is associated with at least four logic segments.

7. The circuit of claim 4, wherein the multiplexing network further includes a charger coupled to the first and second multiplexing output nodes to charge the first and second multiplexing output nodes to an initial value.

8. The circuit of claim 7, wherein the sensor includes a sense amplifier having input nodes coupled to the first and second multiplexing output nodes, the sense amplifier also including output nodes coupled to the adder.

9. The circuit of claim 8, wherein one of the first and second multiplexers includes:
a plurality of logic gates; and
a plurality of switches, each of the switches coupling between an output node of one of the logic gates and one of the first and second multiplexing output nodes.

10. An integrated circuit comprising:
a plurality of first multiplexing networks to receive first input values corresponding to bits of a first number;
a plurality of first sense amplifiers, each of the first sense amplifiers coupling to one of the first multiplexing networks to generate a pair of input data bits based on the first input values;
a plurality of second multiplexing networks to receive second input values corresponding to bits of a second number;
a plurality of second sense amplifiers, each of the second sense amplifiers coupling to one of the second multiplexing networks to generate a pair of input data bits based on the second input values; and
an arithmetic unit coupled to the first sense amplifiers and the second sense amplifiers to receive the pair of input data bits from each of the first sense amplifiers and to receive the pair of input data bits from each of the second sense amplifiers.

11. The integrated circuit of claim 10, wherein the arithmetic unit includes at least one adder to receive a first bit of the pair of input data bits from each of the first sense amplifiers and to receive a first bit of the pair of input data bits from each of the second sense amplifiers.

12. The integrated circuit of claim 11, wherein the at least one adder includes:
a sparse carry-merge generator to generate a first number of carry signals based on the first bit of the pair of input data bits from each of the first sense amplifiers and based on the first bit of the pair of input data bits from each of the second sense amplifiers;

a plurality of intermediate carry generators coupled to the sparse carry merge generator to generate a second number of carry signals; and a plurality of conditional sum generators coupled to the sparse carry-merge generator and the plurality of intermediate carry generators and to provide a sum of a first number represented by first bits from the first sense amplifiers and a second number represented by first bits from the second sense amplifiers.

13. The integrated circuit of claim 12, wherein the sparse carry-merge generator includes a number of logic segments to generate one carry signal for a combination of first bits from at least two of the first sense amplifiers and first bits from at least two of the second sense amplifiers.

14. The integrated circuit of claim 10, wherein each of the first multiplexing networks:
a first multiplexer coupled between a first group of input nodes and a first input node of a corresponding sense amplifier; and
a second multiplexer coupled between a second group of input nodes and a second input node the corresponding of the sense amplifier, the corresponding sense amplifier being one of the first sense amplifiers.

15. The integrated circuit of claim 14, wherein each of the first multiplexing networks further includes a charger coupled to an output node of the first multiplexer and to an output node of the second multiplexer.

16. The integrated circuit of claim 14, wherein the first multiplexer includes:
a plurality of first NOR gates, each of the first NOR gates including a first input node to receive one of the first input values, a second input node coupled to a control node, and an NOR gate output node; and
a plurality of transistors, each of the transistors having a first terminal coupled to the NOR gate output node of one of the first NOR gates, a second terminal coupled to the first input node of the corresponding sense amplifier, and a gate coupled to the control node.

17. The integrated circuit of claim 16, wherein the second multiplexer includes:
a plurality of second NOR gates, each of the second NOR gates including a first input node to receive one of the second input values, a second input node coupled to the control node, and an NOR gate output node; and
a plurality of transistors, each of the transistors having a first terminal coupled to the NOR gate output node of one of the second NOR gates, a second terminal coupled to the second input node of the corresponding sense amplifier, and a gate coupled to the control node.

18. A system comprising:
an integrated circuit including an arithmetic logic unit, the arithmetic logic unit including at least one adder circuit, and the adder circuit including:
a multiplexing network including a first multiplexer and a second multiplexer, the first multiplexer having first input nodes to receive a plurality of first input values and a first multiplexing output node, the second multiplexer having a second multiplexing output node and second input nodes to receive a plurality of second input values, wherein each of the second input values is a complementary value of one of the first input values, wherein the multiplexing network passes a selected first input value of the first input values and a selected second input value of the second input values to the first and second multiplexing output nodes when the selected first and second input values are selected by the first and second multiplexers;

a sensor having input nodes coupled to the first and second multiplexing output nodes to receive the selected first and second input values to generate a first input data bit and a second input data bit, wherein a value of the first input data bit corresponds to one of the first input values, and wherein a value of the second input data bit corresponds to one of the second input values, the sensor also having output nodes to provide the first and second input data bits; and an adder coupled to the output nodes of the sensor to receive the first input data bit to generate a sum of the first input data bit and an additional data bit; and a dynamic random access memory device coupled to the integrated circuit.

19. The system of claim 18, wherein the at least one selector further includes:
a first multiplexer to select from a first group of input values of the plurality of input values to provide a first input value of the pair of input values; and
a second multiplexer to select from a second group of input values of the plurality of input values to provide a second input value of the pair of input values.

20. The system of claim 19, wherein the at least one selector further includes a charger coupled to the first and second multiplexers.

21. The system of claim 18, wherein the integrated circuit includes a processor.

22. A method comprising:
selecting a plurality of selected pairs of input values from among a plurality of first input values;
passing the selected pairs of input values to a plurality of pairs of multiplexing output nodes, wherein each of the selected pairs of input values is passed to one of the pairs of multiplexing input nodes;
sensing each of the pairs of multiplexing output nodes to provide a plurality of pairs of first input data bits;
inputting the pairs of first input data bits into an adder
inputting a plurality of pairs of second input data bits into the adder;
generating a number of first carries based on a first data bit of each of the pairs of first input data bits and a first data bit of each of the pairs of second input data bits;

generating a plurality of first conditional carries for a logic 0 carry-in;
generating a plurality of second conditional carries for a logic 1 carry-in;
generating a number of second carries by selecting between each of the plurality of conditional carries and an associated one of the plurality of second conditional carries in response to a carry-in from one of the first carries;
generating a plurality of first conditional sums for a logic 0 carry-in;
generating a plurality of second conditional sums for a logic 1 carry-in; and
providing a final sum of a first number and a second number by selecting between one of the plurality of first conditional sums and an associated one of the plurality of second conditional sums in response to a carry-in from one of the first and second carries, wherein the first number is represented by the first data bit of each of the pairs of first input data bits, and the second number is represented by a first data bit of each of the pairs of second input data bits.

23. The method of claim 22, wherein each of the pairs of first input data bits includes a logic one bit and a logic zero bit.

24. The method of claim 22 further includes charging the plurality of pairs of multiplexing output nodes to an initial value before passing the selected pairs of input values to the plurality of pairs of multiplexing output nodes.

25. The method of claim 24, wherein passing the selected pair includes forcing a logic one signal to a first output node of each of the pairs of multiplexing output nodes, and forcing a logic zero signal to a second output node of each of the pairs of multiplexing output nodes.

26. The method of claim 22, wherein generating a number of first carries includes generating at least one carry for one-half of input data bits of at least four of the pairs of first input data bits and one-half of input data bits of at least four of the pairs of second input data bits.

* * * * *